(12) United States Patent
Hall et al.

(10) Patent No.: US 6,877,028 B2
(45) Date of Patent: Apr. 5, 2005

(54) SYSTEM AND METHOD FOR TRANSFERRING A DIRECTORY IN PORTIONS OF LIMITED SIZE

(75) Inventors: John M. Hall, Boise, ID (US); Clint S. Cuzzo, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 801 days.

(21) Appl. No.: 09/783,894

(22) Filed: Feb. 13, 2001

(65) Prior Publication Data

US 2002/0112017 A1 Aug. 15, 2002

(51) Int. Cl.$^7$ .............................................. G06F 12/00
(52) U.S. Cl. ........................ 709/213; 709/250; 709/203
(58) Field of Search ................................ 709/203, 213, 709/250; 711/213, 217, 218

(56) References Cited

U.S. PATENT DOCUMENTS 6,052,683 A * 4/2000 Irwin ............................. 707/8
6,170,008 B1 * 1/2001 Bahlmann et al. .......... 709/220
6,658,002 B1 * 12/2003 Ross et al. ................... 370/392

* cited by examiner

Primary Examiner—Reba I. Elmore

(57) ABSTRACT

A system and method are provided for transferring a directory stored in a server. The system comprises a processor circuit with a processor and a memory in the client. The system also includes directory transfer logic stored in the memory and executable by the processor, the directory transfer logic comprising: logic to generate a request for a number of data entries to be transferred from the directory stored in the server and logic to refine a resolution of the request to isolate a defined number of data entries in the directory. Also, the director transfer logic includes logic to transmit the request to the server to transfer the data entries for storage in the memory. In addition, the logical components described herein may also be included in a computer program embodied on a computer readable medium.

19 Claims, 2 Drawing Sheets

SYSTEM AND METHOD FOR TRANSFERRING A DIRECTORY IN PORTIONS OF LIMITED SIZE

TECHNICAL FIELD

The present invention is generally related to the field of data storage and, more particularly, is related to a system and method for transferring a directory.

BACKGROUND OF THE INVENTION

Currently many networks are employed within various organizations such as companies, governmental agencies, and other organizations. Typically, a number of computers or other devices are coupled to the network providing user access to a number of specified individuals. Often, such networks include a server or other device with a directory or database that lists the particular users and machines that are coupled to the network. The information in the directory or database may include, for example, usernames, security passwords, email addresses, and other information as is generally known to those with ordinary skill in the art. By including such information, the directory or database may be employed, for example, for security purposes and other uses. For example, when individuals first log on to the network through a computer coupled to the network, they may be prompted to provide a password that is associated with their username. The directory or database may be consulted to verify that a password entered by a user matches the password associated with the corresponding username.

As the use of networks has developed, network machines have been created to perform the operations of copying, scanning, transmission of documents in digital form, and other services. These network machines have been labeled "multi-function peripherals" that are having an impact on the way that offices operate. For example, such machines have reduced amount of paper used in offices due to their ability to scan one or more documents into digital form and distribute the same to a number of parties specified by the user. Such functionality is generally termed "digital sending," etc.

With the advent of multifunction peripherals and other devices on networks, the directory and/or database have seen new uses. For example, suppose that an individual wishes to scan a document into digital form using a multifunction peripheral to send to one or more users on the network. One must enter the username(s) of the particular recipient(s) to allow the multifunction peripheral to send the digital documents to the recipient(s), accordingly. However, entering the username(s) every time can be somewhat tedious and is subject to error. It may be useful to employ the username information stored in the directory or database to prompt a user based upon the first few characters entered. For example, when entering the name "John Doe", the user may be prompted upon entering "Jo" by displaying the first alphabetically possible name out of the directory or database corresponding to the letters entered. As each subsequent letter is entered, the name displayed changes accordingly.

Unfortunately, such prompting is difficult to accomplish due to the speed considerations. Specifically, a digital sending device must continually request information from the directory or database that is stored in a server, for example, on the network to obtain the names for display. Due to the fact that requests must be transmitted to the appropriate server for such information, the display of prompting information for the user is less than optimal due to slow network speed and other factors.

SUMMARY OF THE INVENTION

In light of the foregoing, the present invention provides for a system for transferring a directory stored in a server. In one embodiment, the system comprises a processor circuit with a processor and a memory in the client. The system also includes directory transfer logic stored in the memory and executable by the processor, the directory transfer logic comprising: logic to generate a request for a number of data entries to be transferred from the directory stored in the server and logic to refine a resolution of the request to isolate a defined number of data entries in the directory. Also, the director transfer logic includes logic to transmit the request to the server to transfer the data entries for storage in the memory.

According to another embodiment, the present invention includes a method for transferring a directory stored in a server, comprising the steps of: copying a number of portions of the directory from the server to a client, thereby completely transferring the directory to the client, and, storing the directory in the client. In the present method, the step of copying a number of portions of the directory from the server to the client may further comprise the steps of: generating a request in the client for transfer of one of the portions of the directory from the server to the client, and, transmitting the request from the client to the server.

In addition, the present invention includes a computer program embodied on a computer readable medium for transferring a directory stored in a server to a client. In this regard, the computer program comprises logic to generate a request for a number of data entries to be transferred from the directory stored in the server to the client, logic to refine a resolution of the request to isolate a defined number of data entries in the directory, and, logic to transmit the request from the client to the server with a request to transfer the data entries for storage in a memory in the client.

The present invention provides several benefits, including the fact that an entire directory may be copied from a server to a client for use in the client for local display of the information from the directory. This is done in spite of the fact that the server imposes a limit on the number of entries that may be transferred at a given time.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
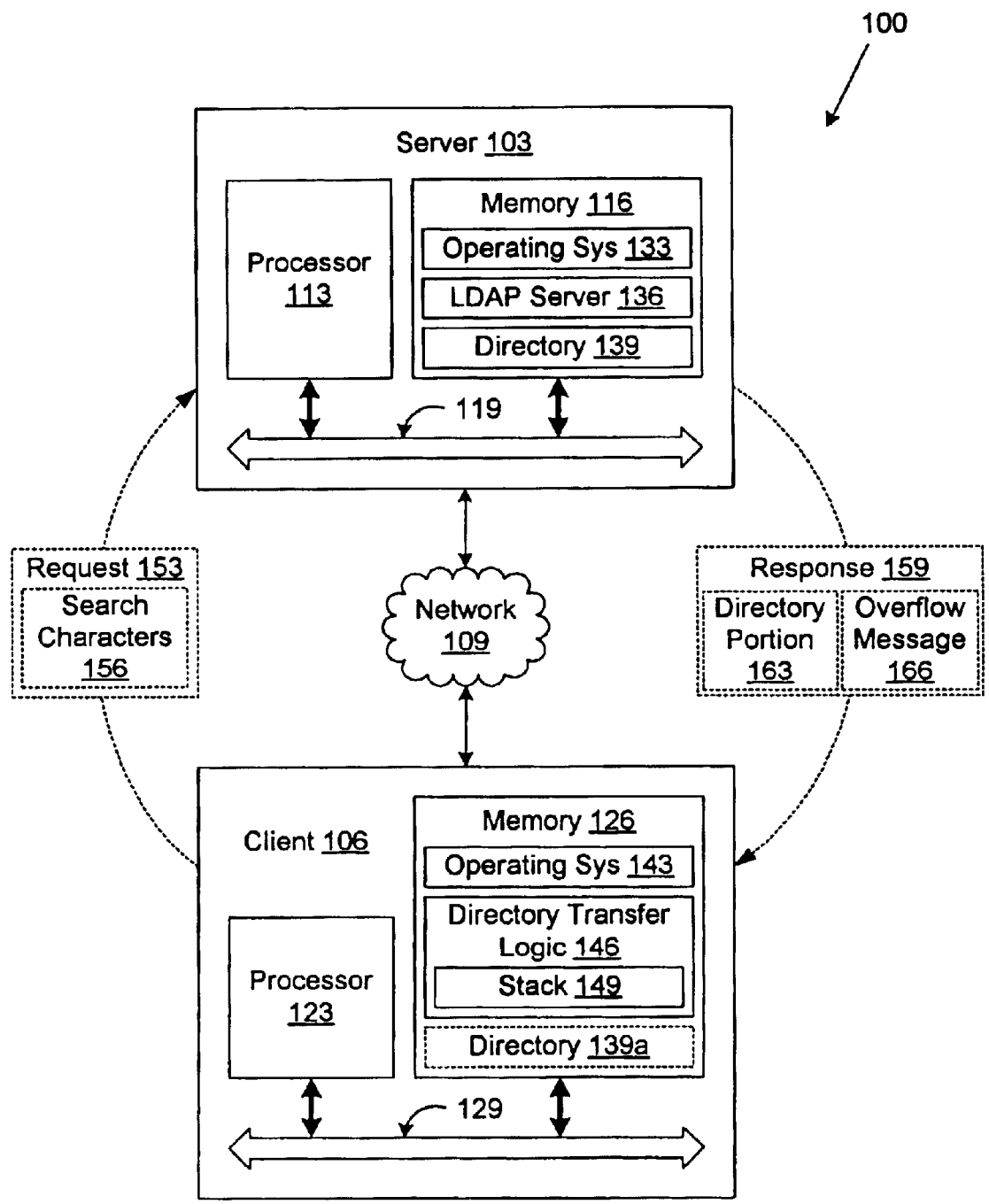
FIG. 1 is a block diagram of a network that employs directory transfer logic according to an embodiment of the present invention.

Turning to FIG. 1, shown is a data transfer network 100 according to an aspect of the present invention. First an explanation of the physical aspects of the present invention are described followed by a description of the operation of the present invention. The data transfer network 100 includes a server 103 and a client 106, both of which are coupled to a network 109. The server 103 and the client 106 may be, for example, computer systems or other suitable systems. In this regard, the server 103 includes a processor circuit that comprises a processor 113 and a memory 116, both of which are coupled to a local interface 119. The local interface may be, for example, a data bus with an accompanying control bus as is generally known by those with ordinary skill in the art. Likewise, the client 106 includes a processor circuit with a processor 123 and a memory 126 coupled to a local interface 129. The local interface 129 may also be, for example, a data bus with an accompanying control bus as is generally known by those with ordinary skill in the art.

Both the server 103 and the client 106 may include a number of user input and output devices. In particular, the user input devices may include, for example, a keypad, touch pad, touch screen, microphone, scanner, mouse, joystick, or one or more push buttons, etc. User output devices may include display devices, indicator lights, speakers, printers, etc. Specific display devices may be, for example, cathode ray tubes (CRT), a liquid crystal display screens, a gas plasma-based flat panel displays, light emitting diodes, or other suitable display device, etc.

The memories 116 and 126 may include both volatile and nonvolatile memory components. Volatile components are those that do not retain data values upon loss of power. Nonvolatile components are those that retain data upon a loss of power. Thus, the memories 116 and 126 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, the processors 113 and 123 may represent multiple processors and the memories 116 and 126 may represent multiple memories that operate in parallel. In such a case, the local interfaces 119 and 129 each may be an appropriate network that facilitates communication between any two of the multiple processors or between any processor and any of the memories, etc. The local interfaces 119 and 129 may facilitate memory to memory communication as well. The processors 113/123, memories 116/126, and local interfaces 119/129 may be electrical or optical in nature. Also, the memories 116/126 may be magnetic in nature.

In addition, the network 109 includes, for example, the Internet, wide area networks (WANs), local area networks, or other suitable networks, etc., or any combination of two or more such networks. The server 103 and client 106 are coupled to the network 109 to facilitate data communication to and from the network 109 in any one of a number of ways that are generally known by those of ordinary skill in the art. The server 103 and client 106 may be linked to the network 109 through various devices such as, for example, network cards, modems, or other such communications devices.

The server 103 also includes a number of software components, for example, that are stored on the memory 116 and executable by the processor 113. These software components include, for example, an operating system 133, a lightweight directory access protocol server 136, and a directory 139. Likewise, the client 106 includes a number of software components, for example, stored on the memory 126 and executable by the processor 123. These software components include, for example, an operating system 143, directory transfer logic 146, a stack 149, and a directory 139a, which is a copy of the directory 139 as will be discussed.

Next a discussion of the operation of the various software components and the network in general according that the present invention is provided. To begin, the client 106 wishes to obtain a full copy of the directory 139 from the server 103 for storage in the memory 126 as the directory 139a. In some situations, the client 106 may ask for a copy of the directory 139 to be transmitted via the network 109 from the server 103 and stored thereafter on the memory 126. However, the client 106 requests information from the directory 139 through the Lightweight Directory Access Protocol (LDAP) server 136, such being generally known by those with ordinary skill in the art. The LDAP server 136 provides limitations on the amount of data that can be transmitted from the directory 139 to the client 106 as is generally understood by those with ordinary skill in the art. As contemplated herein, the LDAP server 136 may be an actual Lightweight Directory Access Protocol server or, alternatively, the LDAP server 136 may represent another system that performs similar functionality.

This is to say that the LDAP server 136 controls the access to the directory 139 by the client 106. Specifically, the client 106 pursuant to the directory transfer logic 146, generates a request 153 for specific data entries in the directory 139. The request 153 includes search characters 156 that are employed by the LDAP server 136 to search the directory 139 for the desired data entries. The search characters 156 are obtained from the stack 149 as will be discussed. The request 153 is therefore directed to the LDAP server 136 to obtain the desired data entries. The LDAP server 136 then provides a search in the directory 139 based upon the search characters 156 supplied in the request 153. Once the LDAP server 136 has found the data entries associated with the search characters 156, the LDAP server 136 then generates a response 159 that is transmitted to the client 106.

The response 159 may include one of two specific types of messages to the client 106. In the first case, the response 159 includes a directory portion 163 that includes a portion of the directory 139 that is obtained based upon the search performed with the search characters 156. In the second case, the response 159 may include an overflow message 166. The overflow message 166 informs the client 106 that the number of data entries obtained from the directory 139 based on the search performed with the search characters 156 exceeds a limit imposed by the LDAP server 136. The limit or maximum number of data entries that the LDAP server 136 may supply in response to a particular request 153 may be any user defined number. Consequently, the overflow message 166 includes no portion of the directory 139.

The fact that the LDAP server 136 includes a limit as to the number of data entries that it can transmit to the client 106 based upon a specific request 153 provides difficulty in transferring the entire directory 139 to the client 106 for storage in the memory 126 as the directory 139a. Consequently, pursuant to the directory transfer logic 146, the client 106 endeavors to insure that the resolution of the search characters 156 for a respective request 153 results in a number of data entries from the directory 139 that does not exceed the limit imposed by the LDAP server 136. In generating requests 153 with search characters 156 that insure that the limit is not breached, the entire directory 139 may be downloaded piece by piece in portions labeled herein as "directory portions" 163. The individual directory portions 163 are collectively stored in the memory 126 as the directory 139a. Next a discussion of the directory transfer logic 146 is provided to provide an understanding of how the resolution of the search characters 156 is adjusted to insure that the number of data entries that are found for a give request 153 does not exceed the maximum limit imposed by the LDAP server 136.

Figure 2:
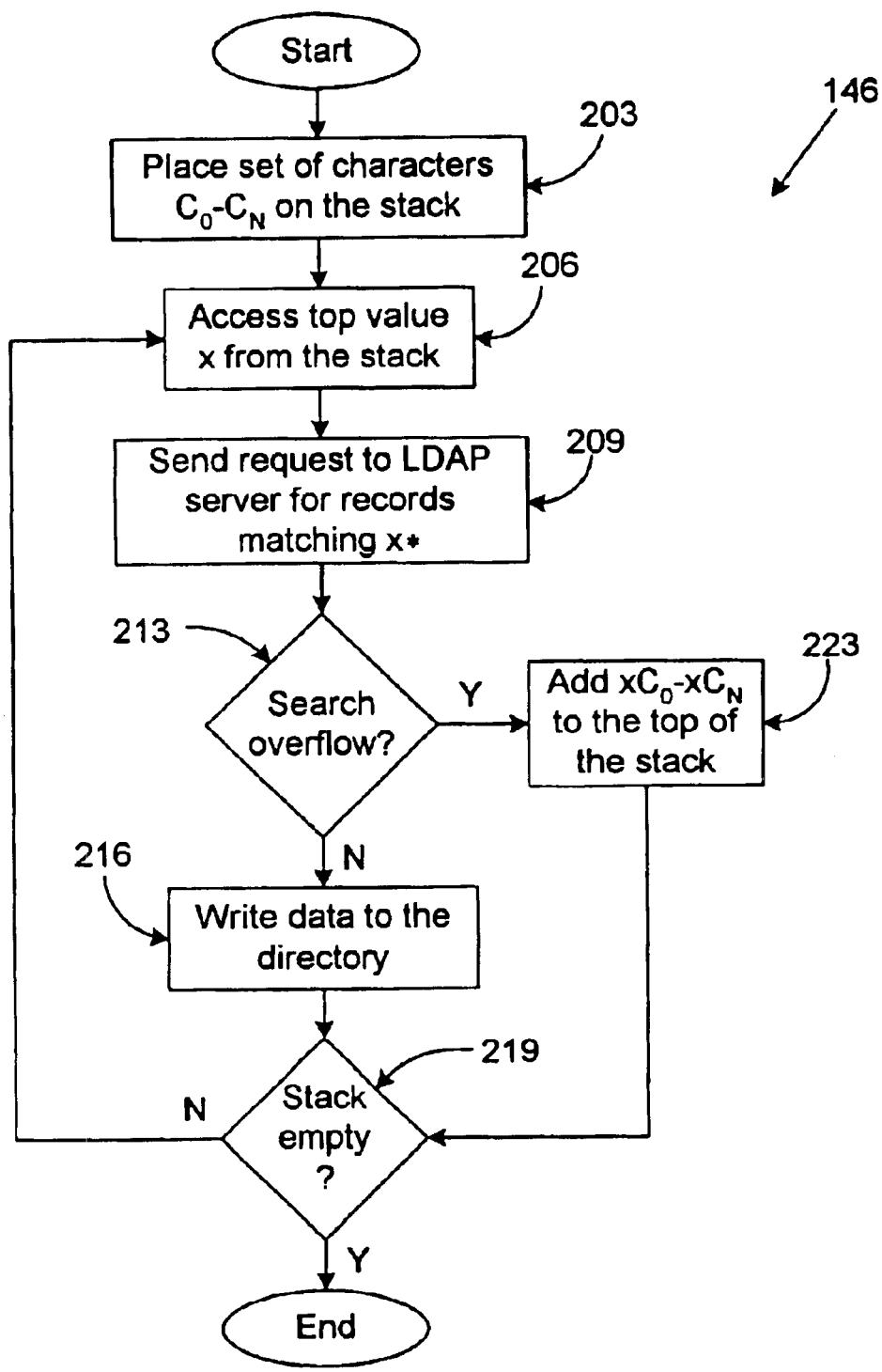
FIG. 2 is a flow chart of the directory transfer logic of FIG. 1.

Turning to FIG. 2, shown is a flow chart of the directory transfer logic 146 according to an embodiment of the present invention. The directory transfer logic 146 is executable by the processor 123 to generate the search characters 156 (FIG. 1) that are included in the request 153 (FIG. 1). Beginning with block 203, the directory transfer logic 146 places a set of characters $C_0$–$C_N$ into the stack 149 (FIG. 1). Note that the set of search characters $C_0$–$C_N$ may include all letters, numbers, punctuation, and/or other symbols that may be generated and stored as characters in the words or values of the directory 139 (FIG. 1). Thereafter, the directory transfer logic 146 moves to block 206 in which the top search character 156 on the stack 149 is removed to sent to the server 103 in a request 153. Thereafter, in block 209 the request 153 is generated and transmitted to the server 103 with the search character 156. The LDAP server 136 performs a search of the directory 139 for all records beginning with the search character 156 received in the request 153. Next, in block 213, it is determined whether a response 159 (FIG. 1) has been received with either an overflow message 166 (FIG. 1) or a directory portion 163 (FIG. 1).

Assuming that no overflow message 166 is received, the directory transfer logic 146 proceeds to block 216 in which the directory portion 163 that was received in the response 159 is written to the memory 126 (FIG. 1) into the directory 139a (FIG. 1). Thereafter, the directory transfer logic 146 moves to block 219 to determine whether the stack 149 is empty. If so, then the directory transfer logic 146 ends accordingly. However, if the stack 149 still contains search characters 156, the directory transfer logic 146 reverts back to block 206 to begin the process once again with the next search character 156 at the top of the stack 149.

Looking back to block 213, assuming that an overflow message 166 is received in a response 159 then the directory transfer logic 146 moves to block 223. In block 223, the resolution of the current search character 156 is refined by dividing it into a number of second search characters that take into account all of the permutations of the first search character 156 and the second search characters $C_0$–$C_N$. This new set of search characters 156 is then placed at the top of the stack. Thereafter, the directory transfer logic 146 moves to block 219 as shown. Thus, the directory transfer logic 146 generates search characters 156 of greater resolution that result in a match with a lesser number of data entries each time an overflow message 166 is received.

Although the directory transfer logic 146 of the present invention is embodied in software executed by general purpose hardware as discussed above, as an alternative the same may also be embodied in dedicated hardware or a combination of software/general purpose hardware and dedicated hardware. If embodied in dedicated hardware, the directory transfer logic 146 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 2 shows the architecture, functionality, and operation of an implementation of the directory transfer logic 146. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow chart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. It is understood that all such variations are within the scope of the present invention. Also, the flow chart of FIG. 2 is relatively self-explanatory and is understood by those with ordinary skill in the art to the extent that software and/or hardware can be created by one with ordinary skill in the art to carry out the various logical functions as described herein.

Also, the directory transfer logic 146 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the directory transfer logic 146 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A system for transferring a directory stored in a server, comprising:

a processor circuit with a processor and a memory in the client;

directory transfer logic stored in the memory and executable by the processor, the directory transfer logic comprising:

logic to general a request for a number of data entries to be transferred from the directory stored in the server;

logic to reline a resolution of the request to isolate a defined number of data entries in the directory; and logic to transmit the request to the server to transfer the data entries for storage in the memory.

2. The system of claim 1, wherein the logic to refine the resolution of the request to isolate the defined number of data entries in the directory further comprises logic to refine the resolution of the request in response to a data entry overflow message received from the server.

3. The system of claim 1, wherein the logic to generate the request further comprises:

logic to place a set of search characters in a stack; and logic to generate the request from a top one of the search characters in the stack.

4. The system of claim 3, wherein the logic to refine the resolution of the request further comprises logic to divide one of the search characters into a set of search characters of greater resolution.

5. The system of claim 4, wherein the logic to refine the resolution of the request further comprises logic to place the number of search characters of greater resolution on a top of the stack.

6. The system of claim 5, wherein the logic to convert one of the search characters into the set of search characters of greater resolution further comprises logic to convert the one of the search characters into the set of search characters of greater resolution in response to a data entry overflow message received from the server.

7. A system for transferring a directory stored in a server, comprising:

query means for generating a request in a client for a number of data entries to be transferred from the directory stored in the server;

refining means for refining a resolution of the request in the client to isolate a defined number of data entries in the directory; and means for transmitting the request to the server to transfer the data entries for storage in a memory in the client.

8. The system of claim 7, wherein the refining means further comprises means for refining the resolution of the request in response to a data entry overflow message received from the server.

9. The system of claim 7, wherein the query means further comprises:

a stack in a memory to store a set of search characters; and means for generating the request from a top one of the search characters in the stack.

10. The system of claim 9, wherein the refining means further comprises means for dividing one of the search characters into a set of search characters of greater resolution.

11. The system of claim 10, wherein the refining means further comprises means for placing the number of search characters of greater resolution on a top of the stack.

12. The system of claim 10, wherein the means for dividing one of the search characters into the set of search characters of greater resolution further comprises means for converting the one of the search characters into the set of search characters of greater resolution in response to a data entry overflow message received from the server.

13. A method for transferring a directory stored a server, comprising the steps of:

copying a number of portions of the directory from the server to a client, thereby completely transferring the directory to the client;

storing the directory in the client; and wherein the step of copying a number of portions of the directory from the server to the client further comprising the steps of:

generating a request in the client for transfer of one of the portions of the directory from the server to the client;

transmitting the request from the client to the server; and wherein the step of generating the request in the client for transfer of one of the portions of the directory from the server to the client further comprises the step of generating a search character included in the request to be employed to perform a search of the directory to isolate the one of the portions of the directory.

14. The method of claim 13, wherein the step of generating the request in the client for transfer of one of the portions of the directory from the server to the client further comprises the step of dividing the search character into a number of second search characters that have a greater resolution in response to a data entry overflow message from the server.

15. A computer program embodied on a computer readable medium for transferring a directory stored in a server to a client, comprising:

logic to generate a request for a number of data entries to be transferred from the directory stored in the server to the client;

logic to refine a resolution of the request to isolate a defined number of data entries in the directory; and logic to transmit the request from the client to the server with a request to transfer the date entries for storage in a memory in the client.

16. The computer program embodied on the computer readable medium of claim 15, wherein the logic to generate a request for a number of data entries to be transferred from the directory stored in the server to the client further comprises logic to refine the resolution of the request in response to a data entry overflow message received in the client from the server.

17. The computer program embodied on the computer readable medium of claim 15, wherein the logic to generate the request further comprises:

logic to place a set of search characters in a stack; and logic to generate the request from a top one of the search characters in the stack.

18. The computer program embodied on the computer readable medium of claim 17, wherein the logic to refine the resolution of the request further comprises logic to divide one of the search characters into a set of search characters of greater resolution.

19. The computer program embodied on the computer readable medium of claim 18, wherein the logic to refine the resolution of the request further comprises logic to place the number of search characters of greater resolution on a top of the stack.

* * * * *

UNITED STATES PATENT AND TRADEMARK OFFICE
CERTIFICATE OF CORRECTION

PATENT NO. : 6,877,028 B2
DATED : April 5, 2005
INVENTOR(S) : Hall et al.

It is certified that error appears in the above-identified patent and that said Letters Patent is hereby corrected as shown below:

Column 7,
Line 56, after "stored", insert -- in --.

Column 8,
Line 3, delete "compris-" and insert therefor -- comprises --.
Line 4, at the beginning of the line, delete "ing".

Signed and Sealed this

Twenty-ninth Day of November, 2005

JON W. DUDAS
*Director of the United States Patent and Trademark Office*